United States Patent [19]

Nguyen

[11] Patent Number: 4,853,442
[45] Date of Patent: Aug. 1, 1989

[54] AMINE-TERMINATED POLYSULFONE SULFIDE, USEFUL AS EPOXY CURING AGENT

[75] Inventor: Tuyen T. Nguyen, New Castle County, Del.

[73] Assignee: Hercules Incorporated, Wilmington, Del.

[21] Appl. No.: 33,563

[22] Filed: Apr. 3, 1987

[51] Int. Cl.$^4$ .............................................. C08G 75/04
[52] U.S. Cl. .................................. 525/471; 525/534; 525/535; 525/537; 564/315; 564/430; 528/99; 528/111; 528/124; 528/125; 528/126; 528/128; 528/172; 528/174
[58] Field of Search ................ 525/471, 534; 564/315, 564/430

[56] References Cited

U.S. PATENT DOCUMENTS

| | | | |
|---|---|---|---|
| 3,594,446 | 6/1971 | Gabler et al. | 525/534 |
| 3,895,064 | 7/1975 | Brode et al. | 564/315 |
| 3,943,107 | 3/1976 | Seltzer et al. | 525/534 |
| 3,948,857 | 4/1976 | Feasey et al. | 528/174 |
| 4,070,349 | 1/1978 | Campbell | 528/388 |
| 4,102,875 | 7/1978 | Campbell | 528/388 |
| 4,562,243 | 12/1985 | Percec | 528/174 |
| 4,654,410 | 3/1987 | Kashiwame et al. | 525/534 |
| 4,746,718 | 5/1988 | Gardner et al. | 525/534 |

FOREIGN PATENT DOCUMENTS

| | | |
|---|---|---|
| 3703550A | 2/1987 | Fed. Rep. of Germany . |
| 61-168629 | 7/1986 | Japan . |
| 676597 | 7/1979 | U.S.S.R. . |
| 952918 | 8/1982 | U.S.S.R. . |

OTHER PUBLICATIONS

"Synthesis and Properties of Sulfur-Containing Oligodiamines and Epoxide Polymers on Their Basis" by Sergeyev, Nedel'kin and Novikov, *Polymer Science* (USSR), vol. 25, No. 6, pp. 1523–1529 (1983).

*Primary Examiner*—John Kight
*Assistant Examiner*—Frederick Krass
*Attorney, Agent, or Firm*—Mark Goldberg; Edmund C. Ross, Jr.

[57] ABSTRACT

Novel sulfur containing polyarylene polyether oligomers are disclosed. The oligomers are prepared through condensing salts of hydroxy and/or thio aromatic compounds, halobenzenoid compounds bearing two replaceable halogens and metal or ammonium sulfides following by end capping the resultant oligomer intermediate with a salt of a hydroxy and/or thio aromatic compound.

12 Claims, No Drawings

AMINE-TERMINATED POLYSULFONE SULFIDE, USEFUL AS EPOXY CURING AGENT

This invention relates to novel sulfur-containing polyarylene polyether oligomers that are amine functional and whose use is facilitated by their solubility in ordinary solvents. This invention also relates to manufacture of such oligomers and their use as reactive ingredients in epoxy resin compositions.

U.S. Pat. No. 4,108,837 to Johnson and Farnham describes polyarylene polyethers made by condensing halobenzenoid compounds bearing two replaceable halogen groups and alkali metal salts of dihydroxy phenols in the presence of highly polar solvent. U.S. Pat. No. 3,895,064 describes amine functional polyarylene polyether oligomers made by reacting an aminophenolate with halogen terminated polyarylene polyethers; and U.S. Pat. No. 3,354,129 shows amine functional polyarylene sulfide as crosslinking as a crosslinking agent Also, the manufacture of amine functional polyarylene polyether oligomers is shown in U.S. Ser. No. 823,912 filed Jan. 30, 1986 in the name of Jabloner and Nguyen; and the use of such oligomers is shown in U.S. Ser. Nos. 702,518 and 724,133 respectively filed Feb. 19, 1985 and Apr. 16, 1985 in the name of Chu, Jabloner and Swetlin. Even still further, the preparation and use of diaminooligoarylenesulfidesulfoxide with 0.9–37% primary amine groups is said to have been achieved in Russian Pat. No. 952,918 published Aug. 23, 1982.

The oligomers of this invention differ from the polyarylene polyethers (or polysulfides) of the prior art in that an amount of the double salt of a dihydroxy aromatic compound used in the condensation reaction is replaced by alkali metal or ammonium sulfide to yield a polyether polysulfide oligomer. The resultant oligomers have a higher glass transition temperature and greater thermal stability than comparable polyarylene polyether oligomers which do not contain sulfur and, yet as opposed to the polysulfides, retain solubility in ordinary solvents as well as other organic materials such as epoxy resins.

The sulfur-containing aromatic polyether oligomers of this invention are characterized by the formula:

where Q and $Q^1$ are each independently $-O-Ph(NHR)_a$, $-S-Ph(NHR)_a$, hydrogen or halogen where Ph is phenylene, O is divalent oxygen, R is hydrogen or lower alkyl and a is one or two; Ar is the residuum of a halobenzenoid compound bearing two replaceable halogens; Z is the residuum of a dihydroxy aromatic compound; S is divalent sulfur and L is:

$$-(Ar)_p-(S-Ar)_m-(Z-Ar)_n- \quad (II)$$

where Ar, Z and S are as above; p is zero or one; m plus n is zero or an integer of one or greater; x is zero or one, provided if x or p is zero then Q is hydrogen; $L^1$ is:

$$-(Ar-S)_{m1}-(Ar-Z)_{n1}-(Ar)-_p \quad (III)$$

where Ar, Z, p and S are as above; m1 plus n1 is zero or an integer of one or greater; y is zero or one provided that if y or m1 plus n1 plus p is zero then $Q^1$ is hydrogen; m plus n plus m1 plus n1 is an integer between one and twenty-five and m plus m1 divided by n plus n1 is less than about nine but greater than zero.

The preferred oligomers on the average have at least fifty (50) percent of the end groups (i.e. Q and $Q^1$) which are amine groups, more preferably at least about 75% of the end groups are primary amine groups. In addition, m plus n plus $m^1$ plus $n^1$ preferably is at least 5 where one of x and y is one.

The oligomers of this invention are prepared by condensation reactions involving the double salt of a dihydroxy aromatic compound, $(Me)_2S$ where Me is an alkali metal or ammonium cation and S is divalent sulfur; a dihalobenzenoid compound bearing two replaceable halogens and the salt of a hydroxy aromatic compound such as an aminophenolate. The oligomers of this invention are preferably made by a multi-step reaction that includes first dehydrating a dihydroxy aromatic compound and then reacting the dehydrated dihydroxy compound and an alkali metal or ammonium sulfide under substantial anhydrous conditions with an excess molar amount of a halobenzenoid compound bearing two replaceable halogens to form a halogen functional oligomer. The halogen functional oligomer is then reacted with an amino phenolate or other such salt of a hydroxy or thiol aromatic amine to form the amine functional oligomer of this invention.

In preferred practice of this invention, amine-terminated polysulfone sulfides are synthesized from dihalodiphenyl sulfone, a dihydric phenol, sodium sulfide and a hydroxy aromatic amine according to the following scheme:

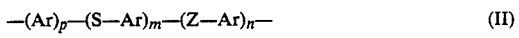

$$m\ K-O-Ar-O-K + n\ Na_2S + (m+n+1)\ X-Ph-SO_2-Ph-X$$
$$(X = F, Cl, Br, NO_2)$$

↓ DMSO, Toluene

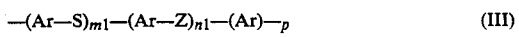

$$X\ [Ph-SO_2-Ph-O-Ar-O]_m-[Ph-SO_2-Ph-S-]_n-Ph-SO_2-Ph-X$$

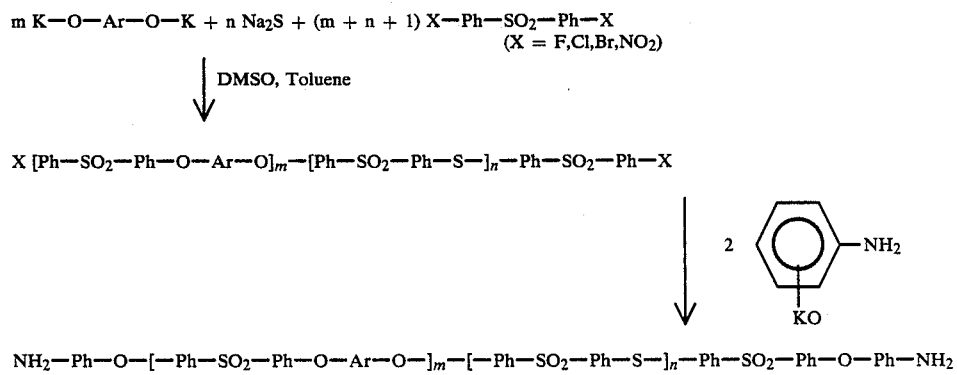

$$NH_2-Ph-O-[-Ph-SO_2-Ph-O-Ar-O-]_m-[-Ph-SO_2-Ph-S-]_n-Ph-SO_2-Ph-O-Ph-NH_2$$

wherein Ph is phenylene, n and m are integers greater than zero that total 3 up to 25 and n divided by m is up to 9. These oligomers have a Tg ranging higher than 165° C. and are soluble in commercial epoxy resins.

Suitable halobenzenoid compounds and dihydroxy aromatic compounds are shown in U.S. Pat. No. 4,108,837 which is hereby incorporated by reference to such disclosures. Dihydroxy aromatic compounds which are dihydroxy phenols are preferred but naphthalene diols can also be used alone or together with one or more dihydroxy phenols. The preferred halobenzenoid compounds bearing two replaceable halogens are diphenylene compounds preferably linked by electron withdrawing groups such as a sulfone group.

Dehydration of the dihydroxy aromatic compound is preferably accomplished using a base such as an alkali metal hydroxide and, more preferably, a combination of an alkali metal hydroxide and an alkali metal carbonate. A polar solvent is preferably used for the dehydration and more preferably an azeotrope former is included to permit withdrawal of water as it is formed. A suitable polar solvent is dimethylsulfoxide. A suitable azeotrope former is toluene or chlorobenzene.

The amount of base employed is preferably that which is slightly less than the number of hydroxy equivalents of the dihydroxy aromatic compound. The amount of carbonate used is at least sufficient to provide a slight excess in the number of equivalents of hydroxide and carbonate over the hydroxy equivalents in the dihydroxy aromatic compound.

Alkali metal or ammonium sulfide is preferably added after the dihydroxy aromatic compound is dehydrated. If the alkali metal or ammonium sulfide is added in hydrated form, the mixture formed with the hydrated sulfide is heated to further remove water so that the resulting mixture preferably has less than 1% by weight water prior to condensation with the halobenzenoid compound.

The temperature used during the dehydration reactions ranges between 80° C. and 250° C., depending upon whether it is conducted under reduced pressure. In addition, the presence of an azeotrope former permits the dehydration to proceed at lower temperatures but inclusion of an azeotrope former is not required.

Halobenzenoid compounds bearing two replaceable halogens and the dehydrated dihydroxy aromatic compounds and sulfide are combined in polar solvent in forming the oligomer. The molar amount of the halobenzenoid compound added exceeds the total number of (a) the moles of the dehydrated dihydroxy aromatic compound and (b) the moles of the sulfide. The halobenzenoid compound, the dihydroxy aromatic compound and the sulfide compound may be added over an extended period of time but preferably the total moles of reactants are added together prior to obtaining reaction conditions which form the oligomer.

After the oligomer is formed, a dehydrated hydroxy or thio aromatic amine is added to endcap the oligomer. The molar amount of the dehydrated hydroxy aromatic amine added is equal to the halogen present in the oligomer. Ordinarily, the molar amount of the dehydrated hydroxy or thio aromatic amine added will equal the excess of the moles of the halobenzenoid compound over the total moles of (a) the sulfide and (b) the dehydrated dihydroxy aromatic compound.

The oligomers of this invention are useful as reactive ingredients in epoxy resin compositions that cure into tough thermosets that are resistant to higher temperatures than comparable polyether oligomers. Thus, the oligomers of this invention can be used in the manner described in U.S. Ser. Nos. 702,518 and 724,133, mentioned hereinbefore, and now incorporated herein by reference. In addition, the oligomers of this invention can be used in the epoxy resin compositions described in U.S. Ser. No. 884,139 filed July 9, 1986 in the name of Gawin and in U.S. Ser. No. 901,097 filed Aug. 29, 1986 in the name of Bard.

The following examples illustrate this invention but are not intended to be limiting thereof. All temperatures are in degrees Centigrade, all parts are parts by weight, and all pressures are at atmospheric unless otherwise specifically noted.

EXAMPLE 1

In this Example, the following reagents and solvents were used:

Bisphenol A

Purchased from Dow Chemical and used without any further purification.

Dichlorodiphenylsulfone

Purchased from American-Hoechst. Said to be 99.9% pure.

m-aminophenol

Purchased from Aldrich and used without purification.

p-aminophenol

Purchased from Chemical Dynamics and used without purification.

Sodium sulfide nonahydrate

Purchased from Aldrich and used without purification.

Toluene

Technical grade toluene was stored over 3A sieve and sparged with $N_2$ for at least one hour prior to use.

Dimethylsulfoxide (DMSO)

Stored over 3A sieve and sparged with $N_2$ for at least one hour prior to use.

Potassium Carbonate

Granular, anhydrous $K_xCO_3$ (Baker's reagent grade) used as received.

KOH Solution

Purchased from VWR (45% concentration). Titrated or OH and $CO_3^{2-}$ content.

Nitrogen

Nitrogen gas passed through a 3A sieve and ridox column before use. Also, in this and subsequent Examples, "SEC" means size exclusion chromatography, "conc" means concentration, and "DSC" means differential scanning calorimetry.

Synthesis of Amine-Terminated Polysulfone Sulfide

A mixture of bisphenol A (50 g, 0.22 mol), aqueous KOH solution (53.11 g, 0.43 mol, 8.00 meq/g and water (30 ml) were heated to 60° C. under nitrogen atmosphere for 30 minutes. Potassium carbonate (25 g, 0.18 mol), sodium sulfide nonahydrate (52.6 g, 0.22 mol) and toluene (200 ml) were added and the mixture was heated to 100° C. to remove water. After 40 ml of the water azeotrope was removed, dimethylsulfoxide (200 ml) was added and more water was collected (35 ml).

After one hour, the reaction was cooled to 95° C. and a solution of 4,4'-dichlorodiphenylsulfone (138.36 g, 0.48 mol), toluene (50 ml) and dimethylsulfoxide (200 ml) was transferred in by using a cannula. The temperature of the mixture was raised to 155° C. by the removal of solvents (water, toluene and DMSO azeotrope). After 16 hours, the reaction was allowed to cool to 90° C. To this reaction mixture a solution of m-aminophenol (9.6 g, 0.09 ml), aqueous KOH solution (10.62 gms, 0.085 mol), water (6 ml), toluene (100 ml) and DMSO (100 ml), which had been dehydrated at 100° C. for 2.5 hours, was added. The resultant solution was kept at 125° C. for 2.5 hours. Coagulation in methanol yielded 120 g (60% yield) of the oligomer. The oligomer has a Tg=158° C.; OH+SH (conc.)=0.06 meq/g; $NH_2$=0.44 meq/g; Mn (SEC)=2190 g/mol; Mn=7120 g/mol; $P_I$=3.25 where $P_I$=Mw/Mn (end group analysis).

EXAMPLE 2

Using the reagents shown in Example 1, another oligomer was prepared as follows:

In a 3-liter, 3-neck flask, equipped with a mechanical stirrer, a Dean-Stark trap and condenser, and a nitrogen in/outlet, a mixture of bisphenol A (150 g, 0.66 mol), an aqueous KOH solution (161.0 g, 1.29 mol, 8.0 meq/g), water (56 ml, to rinse the KOH weighing beaker) and toluene (450 ml) were added. The mixture was heated to 75° C. for 1 hour. A solution of $K_2CO_3$ (25 g) in water (50 ml) was sparged with nitrogen and transferred in, and the resultant mixture was heated to boiling. After 105 ml of water was collected a solution of sodium sulfide nonahydrate (17.53 g, 0.07 mole) in water (40 ml) was transferred in and the reaction mixture was dehydrated further. After one hour, a solid form, and DMSO (45 ml) was added. After two hours, a solution of dichlorodiphenyl sulfone (224.6, 0.78 mol) in toluene (50 ml) and DMSO (300 ml) was added, and the reaction mixture was heated to 160° C., by removing some of the azeotrope distillate, for 16 hours.

To this reaction flask, when it was cooled to 80° C., the dehydrated mixture of para-aminophenol (11.39 g, 0.11 mol), aqueous KOH solution (12.77 g, 0.10 mol), $K_2CO_3$ (5 g), toluene (150 ml) and DMSO (450 ml) was added and the entire mixture was heated to 115° C. for 16 hours. After cooling to room temperature the oligomer dope was coagulated in methanol, filtered and then washed with water until no chloride ion was detected in the washings water ($AgNO_3$ test). After drying in a vacuum oven at 100° C. overnight, 292.22 g (88% yield) of an oligomer was collected. Tg (DSC)=174.5° C.; $NH_2$ (conc.)=0.31 meq/g; OH+SH (conc.)=0.09 meq/g; Cl (conc.)=0.03 meq/g.

EXAMPLE 3

A procedure like that of Example 2 was used as in the synthesis of the oligomer of this Example 3. Bisphenol A (150 g, 0.66 mol), sodium sulfide nonahydrate (67.6 g, 0.28 mol), dichlorodiphenylsulfone (288.8 g, 1.00 mol) and para-aminophenol (14.6 g, 0.13 mol) were used to make 360.3 g (93% yield) of the oligomer; Tg(DSC): 172° C.; $NH_2$(conc.)-0.33 meq/g; OH+CH (conc.)=0.07 meq/g; Cl (conc.)=0.07 meq/g.

EXAMPLE 4

A mixture of sodium sulfide nonahydrate (100 g, 0.42 mol) and toluene (300 ml) was sparged with $N_2$ and dehydrated by removing the water azeotrope layer via a Dean-Stark trap at the boiling temperature. Dimethyl sulfoxide (300 ml) was added after four hours and the dehydration was continued for another two hours. After the mixture temperature was brought to 85° C., a solution of 4,4'-dichlorodiphenyl sulfone (159.4 g, 0.56 mol) in toluene (50 ml) and DMSO (300 ml) was transferred in via a cannula. The temperature of the reaction mixture was increased to 170° C. by removing the azeotropic condensate. After 20 hours, the temperature was lowered to 100° C.

Meanwhile, in a second reactor, a mixture of metaaminophenol (30.3 g, 0.28 mol), aqueous KOH solution (35.0 g, 7.94 meq/g, 0.28 mol), toluene (200 ml) and DMSO (300 ml) was dehydrated for six hours at the boiling temperature of the mixture. The content of the second reactor was transferred into the first one via a cannula. The resultant mixture was kept at 125° C. for 16 hours. The oligomer dope was then coagulated in methanol (methanol/dope volume ratio=10/1) to give a fine white precipitate. The precipitate was filtered, washed with methanol and water until the water wash was free of chloride ion ($AgNO_3$ test). It was then dried in a vacuum oven at 80° C. to give a white powder (110 g, 67% yield); Tg (DSC)=139.5° C.; $NH_2$ (conc.)=1.12 meq/g; OH+SH (conc.)=0.11 meq/g; Cl (X-Ray)=0.16 meq/g.

EXAMPLE 5

A procedure like that of Example 4 was used to produce an oligomer having only sulfur linkages (i.e., no other linkages), sodium sulfide nonahydrate (100 g, 0.42 mol), 4,4'-dichlorodiphenylsulfone (143.4 g, 0.50 mole) and metaaminophenol (18.2 g, 0.17 mole) were used to make 104 g (74.5% yield) of an oligomer; Tg (DSC)=147° C.; OH+SH (conc.)=0.08 meg/g; Cl (x-ray=0.10 meq/g; $NH_2$ (conc.) not available because the sample was insoluble in the solvent system used.

EXAMPLE 6

A series of oligomers was made using the procedures generally described in Examples 1–5. The physical properties of these oligomers are shown in Table I below, such properties being compared to properties of oligomers that are not part of this invention (i.e. oligomers of Runs A, B and Example 5).

In Table I, $K_{IC}$ (MPa m) values are obtained by using an epoxy resin composition which in the case of A is disclosed in U.S. Ser. No. 884,139 filed July 9, 1986 and in the case of B in U.S. Ser. No. 721,133 (allowed) filed Feb. 19, 1985, these applications being hereby incorporated by reference for such disclosures. It can be seen that the oligomers of this invention generally impart a high degree of toughness (e.g. a $K_{IC}$ 1) that is generally comparable to polyarylene polyether oligomers that are free of sulfur.

TABLE 1

| Designation | Expected DP | Theo. % S Content | Tg (DSC) | $NH_2$ Meq/g | SH + OH Meq/g | Cl Meq/g | SEC Mn | PI | $K_I$ (M Pa $\sqrt{m}$) A | B |
| --- | --- | --- | --- | --- | --- | --- | --- | --- | --- | --- |
| A | 10 | 0 | 163° C. | 0.36 | 0.03 | 0.06 | 4410 | 2.6 | 1.57+/−0.05 | 1.54+/−0.1 |

TABLE 1-continued

| Designation | Expected DP | Theo. % S Content | Tg (DSC) | $NH_2$ Meq/g | SH + OH Meq/g | Cl Meq/g | SEC Mn | PI | $K_I$ (M Pa $\sqrt{m}$) A | B |
|---|---|---|---|---|---|---|---|---|---|---|
| B | 10 | 0 | 169° C. | 0.35 | 0.06 | 0.01 | 4710 | 2.8 | 1.34+/−0.02 | 1.72+/−0.04 |
| C | 14 | 10 | 173.5 | 0.31 | 0.10 | 0.04 | 2830 | 4.36 | 1.40+/−0.03 | 1.51+/−0.03 |
| D | 16 | 10 | 175 | 0.26 | 0.13 | 0.03 | 2780 | 4.42 | 1.43+/−0.03 | |
| E | 12 | 10 | 176 | 0.35 | 0.11 | — | 2960 | 3.65 | 1.57+/−0.03 | |
| F | 14 | 30 | — | 0.36 | 0.17 | 0.02 | | | — | 1.23+/−0.03 |
| G | 14 | 30 | 175 | 0.37 | 0.09 | 0.02 | 2240 | 4.06 | 1.32+/−0.03 | 1.14+/−0.02 |
| H | 14 | 30 | 175 | 0.31 | 0.10 | 0.10 | 2700 | 3.69 | 1.36 | 0.84+/−0.05 |
| I | 16 | 30 | 172 | 0.22 | 0.06 | — | 2770 | 4.07 | 1.08+/−0.02 | 0.72+/−0.03 |
| J | 12 | 30 | 171 | 0.35 | 0.09 | — | 2620 | 3.68 | 1.32+/−0.06 | — |
| Example 1 | 10 | 50 | 158° C. | 0.44 | 0.06 | — | 2190 | 3.25 | 1.30+/−0.11 | — |
| K | 14 | 50 | 162.5 | 0.31 | 0.13 | — | | | 0.81+/−0.03 | 0.60+/−0.03 |
| L | | 70 | | 0.34 | 0.04 | — | | | 1.07+/−0.04 | 0.60+/−0.02 |
| Example 2 | 14 | 10 | 174.5 | 0.31 | 0.09 | 0.03 | | | 1.35+/−0.02 | |
| Example 3 | 14 | 30 | 172 | 0.33 | 0.07 | 0.07 | | | 1.36+/−0.02 | |
| M | 14 | 10 | | 0.31 | 0.12 | 0.02 | | | | |
| N | 15 | 30 | 171° C. | 0.26 | 0.10 | — | — | | | |
| Example 5 | 5 | 100 | 147° C. | ND* | 0.10 | — | — | | | |
| Example 4 | 3 | 100 | 39° C. | 1.12 | 0.11 | 0.12 | — | | | |

*ND — Not determined; the oligomer is not soluble in $CHCl_2$ or THF.

What I claim and desire to protect by Letter Patent is:

1. A sulfur-containing aromatic polyether oligomer which is characterized by the formula:

$$Q-L_x-(-S-Ar-Z)-L_y^1-Q^1 \qquad (I)$$

where Q and $Q^1$ are each independently —O—Ph—$(NHR)_a$, —S—Ph—$(NHR)_a$, hydrogen or halogen, where Ph is phenylene, O is divalent oxygen, R is hydrogen or lower alkyl and a is one or two; Ar is the residuum of a halobenzenoid compound bearing two replaceable halogens; Z is the residuum of a dihydroxy aromatic compound; S is divalent sulfur and L is:

$$-(Ar)_p-(S-Ar)_m-(Z-Ar)_n- \qquad (II)$$

where Ar, Z and S are as above; p is zero or one; m plus n is zero or an integer of one or greater; x is zero or one, provided if x or p is zero then Q is hydrogen; $L_1$ is:

$$-(Ar-S)_{m1}-(Ar-Z)_{n1}-(Ar-)_p \qquad (III)$$

where Ar, Z, p and S are as above; m1 plus n1 is zero or an integer of one or greater; y is zero or one provided that if y or m1 plus n1 plus p is zero than $Q^1$ is hydrogen; m plus n plus m1 plus n1 is an integer between one and twenty-five and m plus m1 divided by n plus n1 is less than about nine but greater than zero; provided, however, that an average of at least about 50 mole percent of all the Q and $Q^1$ comprise —O—Ph—$(NHR)_a$ or —S—Ph—$(NHR)_a$.

2. The sulfur-containing oligomer according to claim 1, wherein said halobenzenoid compound comprises a dichlorodiphenylsulfone.

3. The sulfur-containing oligomer according to claim 2, wherein a is one.

4. The sulfur-containing oligomer according to claim 3, wherein said dihydroxy aromatic compound comprises bisphenol A.

5. The sulfur-containing oligomer according to claim 4, wherein Ph is phenylene.

6. The sulfur-containing oligomer according to claim 5, wherein m plus n plus m1 plus n1 is at least 5 and x and y are each one.

7. The sulfur-containing oligomer according to claim 6, wherein p is 1.

8. The sulfur-containing oligomer, according to claim 1, wherein —O—Ph(NHR)$_a$ is the residuum of the salt of a hydroxy aromatic amine.

9. The sulfur-containing oligomer according to claim 8, wherein Ph is a 1,3- or 1,4-phenylene, R is hydrogen and a is one.

10. An amine functional oligomer made by condensing (a) a halobenzenoid compound bearing two replaceable halogens, (b) an alkali metal or ammonium sulfide and (c) a dihydroxy phenol wherein the moles of (a) exceed the moles of (b) and (c) combined and the moles of (b) are up to nine times the moles of (c) followed by reacting an amount of the resulting halogen-terminated oligomer with (d) an alkali metal or ammonium salt of a hydroxy or thio aromatic amine in an amount substantially equal the halogen in said amount of the halogen-terminated oligomer.

11. An amine functional oligomer made in accordance with claim 10 which comprises:

$$NH_2-Ph-O-[-Ph-SO_2-Ph-O-Ar-O-]_m-[Ph-SO_2-Ph-S-]_nPh-SO_2-Ph-O-Ph-NH_2$$

where Ph is phenylene, Ar is the residuum of a dihydric phenol and m plus n equals less than about 25 but greater than 3.

12. An amine functional oligomer made in accordance with claim 10 which comprises:

$$NH_2-Ph-S-[-Ph-SO_2-Ph-O-Ar-O-]_m-[Ph-SO_2-Ph-S-]_nPh-SO_2-Ph-S-Ph-NH_2$$

where Ph is phenylene, Ar is the residuum of a dihydric phenol and m plus n is less than about 25 but greater than 3.

* * * * *

UNITED STATES PATENT AND TRADEMARK OFFICE
CERTIFICATE OF CORRECTION

PATENT NO. : 4,853,442

DATED : AUGUST 1, 1989

INVENTOR(S) : TUYEN T. NGUYEN

It is certified that error appears in the above-identified patent and that said Letters Patent is hereby corrected as shown below:

Column 4, line 4;

"August 29, 1986"    should be    --August 28, 1986-- .

Column 4, line 50;

"or"    should be    --for-- .

Column 6, line 1;

"OH+CH"    should be    --OH + SH-- .

Signed and Sealed this

Twenty-sixth Day of June, 1990

*Attest:*

HARRY F. MANBECK, JR.

*Attesting Officer*    *Commissioner of Patents and Trademarks*